United States Patent
Cherednick et al.

(10) Patent No.: US 7,459,828 B2
(45) Date of Patent: Dec. 2, 2008

(54) SAW SENSOR DEVICE USING SLIT ACOUSTIC WAVE AND METHOD THEREOF

(75) Inventors: Valentin Cherednick, Nizhny Novgorod (RU); Michail Dvoesherstov, Nizhny Novgorod (RU); Yong Lim Choi, Yongin (KR)

(73) Assignee: LG Innotek Co., Ltd, Seoul (KR)

( * ) Notice: Subject to any disclaimer, the term of this patent is extended or adjusted under 35 U.S.C. 154(b) by 538 days.

(21) Appl. No.: 10/517,071

(22) PCT Filed: Jun. 9, 2003

(86) PCT No.: PCT/KR03/01119

§ 371 (c)(1),
(2), (4) Date: Dec. 3, 2004

(87) PCT Pub. No.: WO03/104759

PCT Pub. Date: Dec. 18, 2003

(65) Prior Publication Data

US 2005/0156484 A1    Jul. 21, 2005

(30) Foreign Application Priority Data

Jun. 8, 2002 (KR) .................. 10-2002-0032146
Jun. 8, 2002 (KR) .................. 10-2002-0032147

(51) Int. Cl.
*H01L 41/08* (2006.01)
(52) U.S. Cl. .................................. 310/313 R
(58) Field of Classification Search ............. 310/313 B, 310/313 C, 313 D, 331, 313 A; 333/193–195; 73/703, 723
See application file for complete search history.

(56) References Cited

U.S. PATENT DOCUMENTS

| 4,216,401 | A | * | 8/1980 | Wagner ................. 310/313 R |
| 4,454,440 | A | * | 6/1984 | Cullen ................... 310/313 R |
| 5,051,645 | A |   | 9/1991 | Brace |
| 6,121,713 | A | * | 9/2000 | Inoue et al. ............. 310/313 A |
| 6,445,265 | B1 | * | 9/2002 | Wright ..................... 333/193 |

FOREIGN PATENT DOCUMENTS

| JP | 62-157543 | 7/1987 |
| JP | 62-157543 | 10/1987 |
| JP | 08-285708 | 1/1996 |

* cited by examiner

*Primary Examiner*—Darren Schuberg
*Assistant Examiner*—Karen B. Addison
(74) *Attorney, Agent, or Firm*—Birch, Stewart, Kolasch & Birch, LLP

(57) ABSTRACT

The present invention discloses an SAW sensor device using a slit acoustic wave and a method thereof. The SAW sensor device using the slit acoustic wave includes a piezoelectric medium having a thin membrane at its one portion, a medium at the other portion, and a narrow slit which the slit acoustic wave passes through at its inside, an input IDT formed at the outer portion in the narrow slit of the piezoelectric medium, for transducing an electric input signal into the slit acoustic wave, and an output IDT formed at the outer portion opposite to the input IDT, for receiving the propagated slit acoustic wave and transducing the wave into an electric signal, whereby an external pressure transmitted to the device is sensed. The SAW sensor device using the slit acoustic wave and the method thereof can obtain intensity of the external pressure and viscosity and dielectric permittivity of liquid passing through the narrow slit by using correlations of frequency and velocity shifts of the slit acoustic wave generated in a resonator of the narrow slit.

9 Claims, 2 Drawing Sheets

SAW SENSOR DEVICE USING SLIT ACOUSTIC WAVE AND METHOD THEREOF

TECHNICAL FIELD

The present invention relates to a surface acoustic wave (SAW) device, and more particularly to an SAW sensor device using a slit acoustic wave which can sense intensity of an external pressure and viscosity and dielectric permittivity of liquid by using correlations of frequency and velocity shifts of the slit acoustic wave generated in a resonator, like using a surface acoustic wave generated in a resonator of an SAW device, and a method thereof.

BACKGROUND ART

Recently, mobile communication apparatuses such as cellular phones and portable information terminals have been rapidly distributed due to development of a mobile communication system. Thus, there are increasing demands for miniaturization and high performance of the apparatuses and their components. In addition, two kinds, namely analog and digital type wireless communication systems are used for cellular phones, and a frequency for the wireless communication varies from a band of 800 MHz~1 GHz to a band of 1.5 GHz to 2.0 GHz.

A dielectric resonator duplexer has been generally used as an antenna duplexer for the mobile communication system in consideration of low loss, power efficiency and temperature stability.

However, an SAW (Slit Acoustic Wave) duplexer is newly recommended on the basis of recent low loss design of an SAW filter, development of a power efficiency material, and development of a medium having a stabilized temperature property.

When the dielectric duplexer is compared with the SAW duplexer, the SAW duplexer has equal or more excellent properties to/than the dielectric duplexer, except for power efficiency. Especially, the SAW duplexer is absolutely advantageous in shape and size. Nevertheless, the SAW duplexer is still more expensive than the dielectric resonator type duplexer. When mass production of the SAW duplexer is achieved according to the property of an SAW manufacturing process using a semiconductor process, the SAW duplexer will have a competitive price.

FIG. 1 is a schematic diagram illustrating a general SAW filter. As illustrated in FIG. 1, the SAW filter includes a single crystal medium 101, an input inter-digital transducer (IDT) and an output IDT 103.

When the single crystal medium 101 is a piezoelectric single crystal medium such as quartz, $LiTaO_3$ and $LiNbO_3$, the input IDT 102 and the output IDT 103 are comprised of thin metal membranes.

In FIG. 1, an electric signal transmitted to the input IDT 102 is transduced into a mechanical wave by the piezoelectric single crystal medium 101, and propagated to the output IDT 103 through the single crystal medium 101. The wave transmitted to the output IDT 103 is re-transduced into an electric signal according to piezoelectric effects, and then outputted.

That is, the SAW filter generally used in a mobile communication terminal for filtering high frequency signals is a manual device for selectively passing wanted frequency signals by patternizing a transducer on the piezoelectric single crystal medium with thin metal membranes, and connecting the transducer to I/O terminals.

A frequency response total transfer function of the resonator of the SAW filter is provided as a composite function of material properties such as physical properties of a piezoelectric material, purity of a crystal and properties of a thin metal membrane, and device variables including variables considered in electrode design.

There have been known that a limit of a minimum value of a resonance frequency range is determined by a size of the device, and that a limit of a maximum value thereof is influenced by a line width of an electrode and loss of electric wave. Because the resonator has a very narrow bandwidth frequency response and a long impulse response, it can embody wanted properties by precisely manufacturing an electrode according to an electrode design.

As described above, the properties of the SAW device are intended to be applied to the other application fields, especially in the sensor field.

DISCLOSURE OF THE INVENTION

An object of the invention is to solve at least the above problems and/or disadvantages and to provide at least the advantages described hereinafter.

Accordingly, one object of the present invention is to solve the foregoing problems by providing an SAW sensor device using a slit acoustic wave which can sense intensity of an external pressure and viscosity and dielectric permittivity of liquid passing through a narrow slit, by using correlations of frequency and velocity shifts of the slit acoustic wave generated in a resonator, like using a surface acoustic wave generated in a resonator of an SAW device, and a method thereof.

The foregoing and other objects and advantages are realized by providing an SAW sensor device using a slit-acoustic wave, including: a piezoelectric medium having a thin membrane at its one portion, a medium at the other portion, and a narrow slit which the slit acoustic wave passes through at its inside; an input IDT formed at the outer portion in the narrow slit of the piezoelectric medium, for transducing an electric input signal into the slit acoustic wave; and an output IDT formed at the outer portion opposite to the input IDT, for receiving the propagated slit acoustic wave and transducing the wave into an electric signal, whereby an external pressure transmitted to the device is sensed.

A width of the narrow slit is varied according to the pressure transmitted to the thin membrane, and a velocity of the slit acoustic wave propagated in the narrow slit is shifted according to variations of the width of the narrow slit.

In addition, the velocity of the slit acoustic wave is shifted according to a property of the medium of the piezoelectric medium.

According to another aspect of the invention, an SAW sensor device using a slit acoustic wave includes: a piezoelectric medium having a narrow slit which the slit acoustic wave passes through at its inside, and being divided into an upper portion and a lower portion from the narrow slit; an input IDT formed at one side of the piezoelectric medium, for transducing an electric input signal into the slit acoustic wave; an output IDT formed at the opposite side to the input IDT in the piezoelectric medium, for receiving the propagated slit acoustic wave, and transducing the wave into an electric signal; an input liquid port for inputting the liquid into the narrow slit of the piezoelectric medium; and an output liquid port for outputting the liquid of the narrow slit of the piezoelectric medium, whereby liquid in the device is sensed.

When the liquid flows in the narrow slit, dielectric permittivity and viscosity of the liquid are sensed by measuring a velocity and frequency of the slit acoustic wave of the liquid of the narrow slit.

According to another aspect of the invention, a method for sensing an external pressure of an SAW sensor device includes the steps of: (a) when a thin membrane does not receive a pressure, calculating a frequency and velocity of electric signals of an input IDT and an output IDT in a narrow slit, and comparing the resultant values; (b) when the thin membrane receives an external pressure, calculating a frequency and velocity of electric signals of the input IDT and the output IDT, and comparing the resultant values; and (c) sensing intensity of the external pressure in consideration of velocity and frequency shifts due to the external pressure transmitted to the thin membrane.

Step (c) for sensing the intensity of the external pressure is performed by previously setting frequency and velocity shift value data under the external pressure in an external device, and comparing the data values.

According to another aspect of the invention, a method for sensing liquid of an SAW sensor device includes the steps of: (a) measuring a phase velocity of a slit acoustic wave proceeding in an empty slit, and calculating a frequency; (b) when the liquid flows in the narrow slit through an input liquid port, measuring a phase velocity of the slit acoustic wave in the narrow slit, and calculating a frequency; and (c) sensing dielectric permittivity and viscosity of the liquid passing through the narrow slit in consideration of velocity and frequency shifts.

Step (b) for measuring the phase velocity of the slit acoustic wave and calculating the frequency calculates the velocity and frequency of the slit acoustic wave when the liquid is filled in an output liquid port.

Step (c) for sensing the dielectric permittivity and viscosity of the liquid is performed by previously setting dielectric permittivity and viscosity data of all kinds of liquids in an external device, and comparing the data values.

In accordance with the present invention, the intensity of the external pressure and the viscosity and dielectric permittivity of the liquid can be sensed by using correlations of the frequency and velocity shifts of the slit acoustic wave generated in a resonator, like using a surface acoustic wave generated in a resonator of an SAW device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE FOR CARRYING OUT THE INVENTION

The following detailed description will present an SAW sensor device using a slit acoustic wave and a method thereof according to preferred embodiments of the invention in reference to the accompanying drawings.

Figure 1:
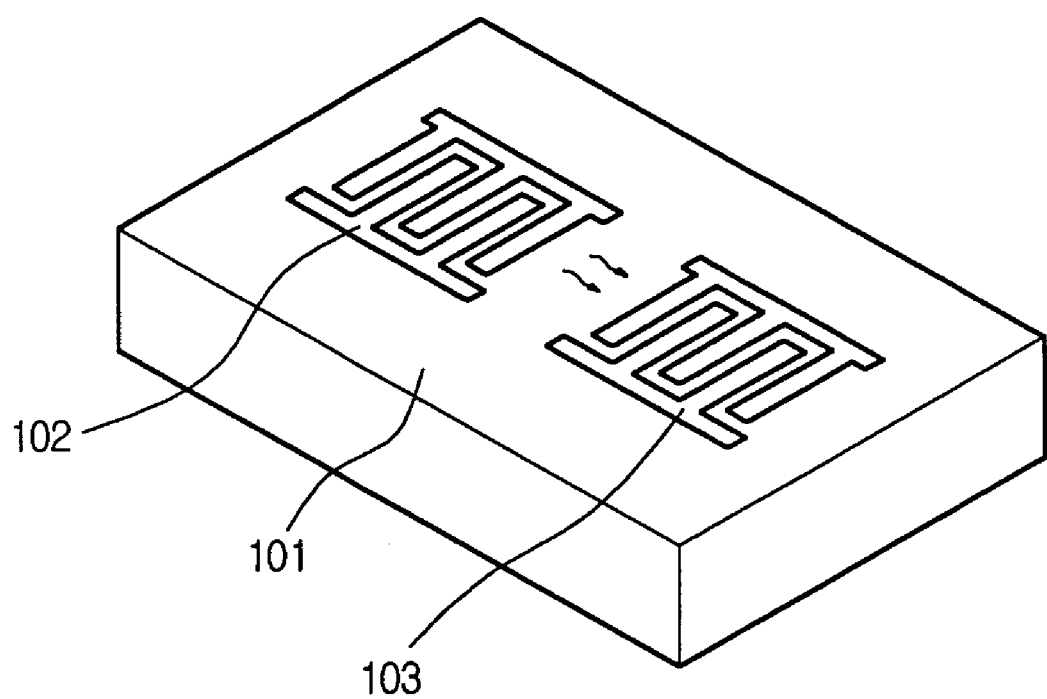
FIG. 1 is a schematic diagram illustrating a general SAW filter.
Figure 2:
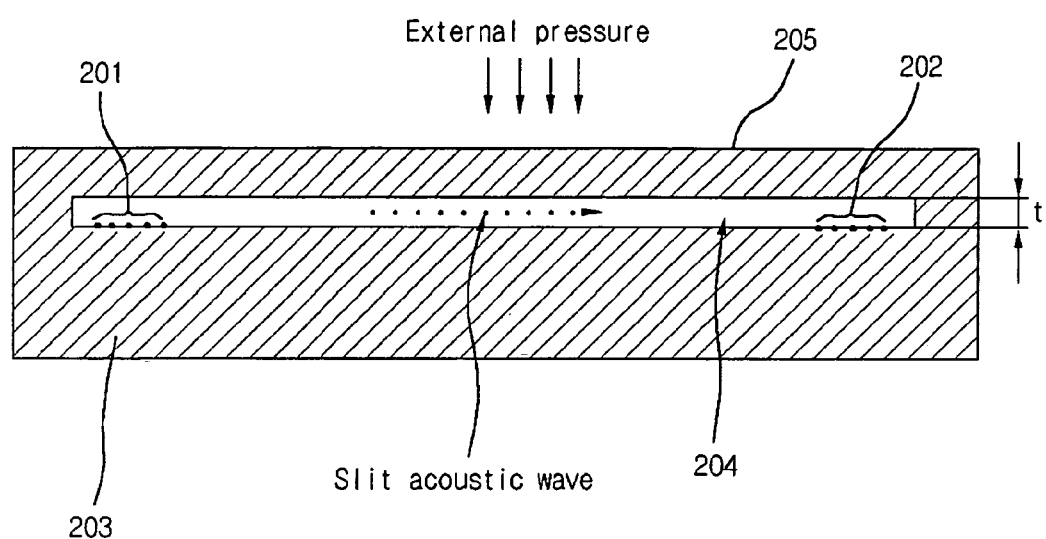
FIG. 2 is a schematic cross-sectional diagram illustrating an SAW sensor device operated as a pressure sensor by using a slit acoustic wave in accordance with a first embodiment of the present invention.

FIG. 2 is a schematic cross-sectional diagram illustrating an SAW sensor device operated as a pressure sensor by using a slit acoustic wave in accordance with a first embodiment of the present invention.

Referring to FIG. 2, the SAW sensor device operated as the pressure sensor by using the slit acoustic wave includes a piezoelectric medium 203 having a thin membrane 205 at its upper portion, a medium at its lower portion, and a narrow slit 204 which the slit acoustic wave passes through at its inside, an input IDT 201 formed at the outer portion in the narrow slit 204 of the piezoelectric medium 203, for transducing an electric input signal into the slit acoustic wave, and an output IDT 202 formed at the outer portion opposite to the input IDT 201, for receiving the propagated slit acoustic wave and transducing the wave into an electric signal.

The operation principle of the SAW sensor device operated as the pressure sensor in accordance with the present invention will now be explained.

The input IDT 201 transduces an electric signal into a vibration type signal which is a slit acoustic wave, and the slit acoustic wave is propagated along the piezoelectric medium 203.

That is, in the SAW sensor device, when a metal electrode is formed on a medium showing high insulation and piezoelectricity is generated on the metal electrode, the medium temporarily hogs. A physical wave is generated by using the operation. Because a velocity of a wave transmitted on the surface of the SAW sensor device is lower than that of an electric wave, the SAW sensor device is used as a filter for temporarily delaying an electric signal, or passing a specific frequency signal.

Accordingly, the slit acoustic wave, a specific frequency signal propagated along the piezoelectric medium 203 shows a state of a wave transmitted along the surface of the medium in the same concept as a surface acoustic wave of a general SAW device. Here, waves are divided into transverse waves and longitudinal waves according to properties of the piezoelectric medium 203. In addition, such waves are attenuated under various conditions such as medium properties.

On the other hand, the upper side thin membrane 205 of the narrow slit 204 in the piezoelectric medium 203 is comprised of a thin piezoelectric medium deformed due to an external pressure, and the slit acoustic wave can proceed in the narrow slit 204. In the slit acoustic wave propagated along the piezoelectric medium 203, the vibration type signal is transduced into an electric signal by the output IDT 202.

Here, when an external pressure is transmitted to the thin membrane 205, the thin membrane 205 hogs. A width (t) of the narrow slit 204 is varied, and thus a phase velocity of the slit acoustic wave proceeding in the narrow slit 204 is also shifted.

In addition, an additional stress is generated on the piezoelectric medium 203, to shift the velocity of the slit acoustic wave.

That is, the phase velocity of the slit acoustic wave is dependent upon the width (t) of the narrow slit 204.

Therefore, correlations of the width (t) of the narrow slit 204 and the velocity of the slit acoustic wave are obtained on the basis of the facts that the width (t) of the narrow slit 204 is varied according to intensity of the external pressure and that the velocity of the slit acoustic wave is shifted due to variations of the width (t) of the narrow slit 204, thereby sensing intensity of the external pressure.

The process for operating the SAW sensor device as the pressure sensor will now be described in detail.

When the thin membrane 205 does not receive a pressure, a frequency and velocity of an electric signal of the input IDT 201 are calculated, a frequency and velocity of an electric signal of the output IDT 202 are calculated, and the resultant values are compared with each other (S21). Here, the frequency and velocity of the input and output signals are rarely shifted.

When the thin membrane 205 receives an external pressure, a frequency and velocity of an electric signal of the input IDT 201 are calculated, a frequency and velocity of an electric signal of the output IDT 202 are calculated, and the resultant values are compared with each other (S22). At this time, the frequency and velocity of the input and output signals are shifted.

In addition, the correlations can be obtained by using the formula 'f=v/λ'. Here, 'f', 'v' and 'λ' respectively represent frequency, velocity and wavelength.

Thus, the velocity shift causes the frequency shift, which is dependent upon the external pressure.

That is, when the thin membrane 205 receives an external pressure, the narrow slit 204 hogs, which influences the slit acoustic wave proceeding in the narrow slit 204. Accordingly, the frequency and velocity of the signals of the input IDT 201 and the output IDT 202 are shifted.

The frequency and velocity shift value data under the external pressure are previously set in an external device in the form of a database (S23).

Therefore, the intensity of the external pressure can be sensed by comparing the velocity and frequency values shifted due to the external pressure transmitted to the thin membrane 205 with the velocity and frequency shift data values of the database (S24), so that the SAW sensor device can be operated as the pressure sensor.

SECOND EXAMPLE

Figure 3:
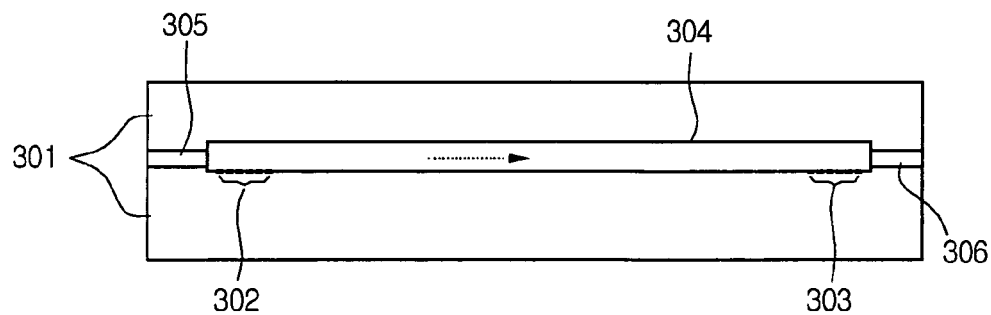
FIG. 3 is a schematic cross-sectional diagram illustrating an SAW sensor device operated as a liquid sensor by using a slit acoustic wave in accordance with a second embodiment of the present invention.

FIG. 3 is a schematic cross-sectional diagram illustrating an SAW sensor device operated as a liquid sensor by using a slit acoustic wave in accordance with a second embodiment of the present invention.

As depicted in FIG. 3, the SAW sensor device operated as the liquid sensor includes a piezoelectric medium 301 having a narrow slit 304 which the slit acoustic wave passes through at its inside, and being divided into an upper portion and a lower portion from the narrow slit 304, an input IDT 302 formed at one side of the piezoelectric medium 301, for transducing an electric input signal into the slit acoustic wave, an output IDT 303 formed at the opposite side to the input IDT 302 in the piezoelectric medium 301, for receiving the propagated slit acoustic wave, and transducing the wave into an electric signal, an input liquid port 305 for inputting the liquid into the narrow slit 305 of the piezoelectric medium 301, and an output liquid port 306 for outputting the liquid of the narrow slit 304 of the piezoelectric medium 301.

The operation principle of the SAW sensor device operated as the liquid sensor in accordance with the present invention will now be explained.

The slit acoustic wave transduced in the input IDT 302 is transmitted by the piezoelectric medium 301, and re-transduced into an electric signal in the output IDT 303. The slit acoustic wave passing through the narrow slit 304 of the piezoelectric medium 301 passes a specific frequency.

When the slit acoustic wave is propagated in the narrow slit 304 of the piezoelectric medium 301, a phase velocity of the slit acoustic wave is dependent upon dielectric permittivity of liquid in the narrow slit 304. That is, when there are presumed that a velocity of a slit acoustic wave proceeding in an empty slit is $v_0$ and a velocity of a slit acoustic wave proceeding in a slit with liquid is $v_1$, the phase velocity of the slit acoustic wave is shifted according to dielectric permittivity of the liquid.

In addition, loss of wave power is generated according to viscosity of the liquid, which shifts the phase velocity.

Because the phase velocity of the slit acoustic wave is shifted according to the viscosity and dielectric permittivity of the liquid, the SAW sensor device is operated as the liquid sensor by using the correlations. This operation will now be described in detail.

In order to obtain the viscosity and dielectric permittivity of the liquid, the phase velocity $v_0$ of the slit acoustic wave proceeding in the empty slit 304 is measured (S304), and a frequency $f_0$ is calculated (S31). Here, the correlations of the velocity and frequency can be obtained by using the formula 'f=v/λ'.

When the liquid flows in the narrow slit 304 through the input liquid port 305, the phase velocity $v_1$ of the slit acoustic wave in the narrow slit 304 is measured, and a frequency $f_1$ is calculated (S32). Here, the velocity and frequency of the slit acoustic wave when the liquid is filled in the output liquid port 306 are calculated.

Therefore, the dielectric permittivity and viscosity of the liquid passing through the narrow slit 304 can be obtained in consideration of velocity shifts $v_0$ and $v_1$ and frequency shifts $f_0$ and $f_1$.

That is, dielectric permittivity and viscosity value data of all kinds of liquids due to the phase velocity and frequency shifts of the slit acoustic wave are previously set in an external device in the form of a database (S33).

Here, the dielectric permittivity and viscosity of the liquid can be sensed by searching similar values to the dielectric permittivity and viscosity value data of all kinds of liquids previously set in the external device (S34), so that the SAW device can be operated as the liquid sensor.

INDUSTRIAL APPLICABILITY

As discussed earlier, in accordance with the present invention, the SAW sensor device using the slit acoustic wave and the method thereof can sense the intensity of the external pressure by using the correlations of the frequency and velocity shifts of the slit acoustic wave generated in the resonator, like using the surface acoustic wave generated in the resonator of the SAW device.

In addition, the SAW sensor device using the slit acoustic wave and the method thereof can obtain the viscosity and dielectric permittivity of the liquid passing through the narrow slit by using the correlations of the frequency and velocity shifts of the slit acoustic wave generated in the resonator of the SAW device slit.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An SAW sensor device using a slit acoustic wave, comprising:
   a piezoelectric medium having a thin membrane at its one portion, a medium at the other portion, and a narrow slit which the slit acoustic wave passes through at its inside;
   an input IDT formed at the outer portion in the narrow slit of the piezoelectric medium, for transducing an electric input signal into the slit acoustic wave; and
   an output IDT formed at the outer portion opposite to the input IDT, for receiving the propagated slit acoustic wave and transducing the wave into an electric signal, whereby an external pressure transmitted to the device is sensed,
   wherein a width of the narrow slit is varied according to the pressure transmitted to the thin membrane.

2. The SAW sensor device according to claim 1, wherein a velocity of the slit acoustic wave propagated in the narrow slit is shifted according to variations of the width of the narrow slit.

3. The SAW sensor device according to claim 1, wherein the velocity of the slit acoustic wave is shifted according to a property of the medium of the piezoelectric medium.

4. An SAW sensor device using a slit acoustic wave, comprising:
   a piezoelectric medium having a narrow slit which the slit acoustic wave passes through at its inside, and being divided into an upper portion and a lower portion from the narrow slit, for sensing liquid in the device;
   an input IDT formed at one side of the piezoelectric medium, for transducing an electric input signal into the slit acoustic wave;
   an output IDT formed at the opposite side to the input IDT in the piezoelectric medium, for receiving the propagated slit acoustic wave, and transducing the wave into an electric signal;
   an input liquid port for inputting the liquid into the narrow slit of the piezoelectric medium; and
   an output liquid port for outputting the liquid of the narrow slit of the piezoelectric medium.

5. The SAW sensor device according to claim 4, wherein, when the liquid flows in the narrow slit, dielectric permittivity and viscosity of the liquid are sensed by measuring a velocity and frequency of the slit acoustic wave of the liquid of the narrow slit.

6. A method for sensing an external pressure of an SAW sensor device, comprising the steps of:
   (a) when a thin membrane does not receive a pressure, calculating a frequency and velocity of electric signals of an input IDT and an output IDT in a narrow slit, and comparing the resultant values;
   (b) when the thin membrane receives an external pressure, calculating a frequency and velocity of electric signals of the input IDT and the output IDT, and comparing the resultant values; and
   (c) sensing intensity of the external pressure in consideration of velocity and frequency shifts due to the external pressure transmitted to the thin membrane,
   wherein step (c) for sensing the intensity of the external pressure is performed by previously setting frequency and velocity shift value data under the external pressure to an external device, and comparing the data values.

7. A method for sensing liquid of an SAW sensor device, comprising the steps of:
   (a) measuring a phase velocity of a slit acoustic wave proceeding in an empty slit, and calculating a frequency;
   (b) when the liquid flows in the narrow slit through an input liquid port, measuring a phase velocity of the slit acoustic wave in the narrow slit, and calculating a frequency; and
   (c) sensing dielectric permittivity and viscosity of the liquid passing through the narrow slit in consideration of velocity and frequency shifts.

8. The method according to claim 7, wherein step (b) for measuring the phase velocity of the slit acoustic wave and calculating the frequency calculates the velocity and frequency of the slit acoustic wave when the liquid is filled in an output liquid port.

9. The method according to claim 7, wherein step (c) for sensing the dielectric permittivity and viscosity of the liquid is performed by previously setting dielectric permittivity and viscosity data of all kinds of liquids in an external device, and comparing the data values.

* * * * *